(12) United States Patent
Moser et al.

(10) Patent No.: US 11,883,986 B2
(45) Date of Patent: Jan. 30, 2024

(54) METHOD FOR OPERATING AN INJECTION-MOULDING MACHINE, IN PARTICULAR WITH RESPECT TO IMPROVED CONSTANT MOULD FILLING, AND INJECTION-MOULDING MACHINE FOR CARRYING OUT THE METHOD

(71) Applicant: KRAUSSMAFFEI TECHNOLOGIES, Munich (DE)

(72) Inventors: Stefan Moser, Hallbergmoos (DE); Nicolina Topic, Munich (DE); Sina Greger, Munich (DE)

(73) Assignee: KRAUSSMAFFEI TECHNOLOGIES, Munich (DE)

( * ) Notice: Subject to any disclaimer, the term of this patent is extended or adjusted under 35 U.S.C. 154(b) by 427 days.

(21) Appl. No.: 17/282,923

(22) PCT Filed: Sep. 30, 2019

(86) PCT No.: PCT/EP2019/076368
§ 371 (c)(1),
(2) Date: Apr. 5, 2021

(87) PCT Pub. No.: WO2020/083611
PCT Pub. Date: Apr. 30, 2020

(65) Prior Publication Data
US 2021/0387392 A1 Dec. 16, 2021

(30) Foreign Application Priority Data
Oct. 23, 2018 (DE) .................... 10 2018 126 313.9

(51) Int. Cl.
*B29C 45/77* (2006.01)
*B29C 45/76* (2006.01)

(52) U.S. Cl.
CPC ............ *B29C 45/77* (2013.01); *B29C 45/762* (2013.01); *B29C 2945/76006* (2013.01);
(Continued)

(58) Field of Classification Search
CPC .... B29C 2045/776; B29C 2945/76006; B29C 2945/76197; B29C 2945/76257;
(Continued)

(56) References Cited

U.S. PATENT DOCUMENTS

| 10,245,771 B2 | 4/2019 | Schiffers et al. |
| 2001/0030375 A1* | 10/2001 | Kamiguchi ........... B29C 45/768 425/149 |

(Continued)

FOREIGN PATENT DOCUMENTS

| DE | 2358911 A1 | 6/1974 |
| DE | 3524310 C1 | 6/1986 |

(Continued)

OTHER PUBLICATIONS

International Preliminary Examination Report for PCT/EP2019/076368 dated Nov. 18, 2020.
(Continued)

*Primary Examiner* — Kidest Bahta
(74) *Attorney, Agent, or Firm* — Pearne & Gordon LLP

(57) ABSTRACT

A method for operating an injection-molding machine, including the steps: a) in a current injection-molding cycle, after an accepted-part reference injection-molding cycle learned in a learning phase: detecting a compound pressure change $k_1$ relative to an accepted-part reference compound pressure $p_{masse,\,ref}$ during at least part of an injection phase of the current injection-molding cycle by measuring a current compound pressure $p_{masse,\,act}$ and comparing the current compound pressure $p_{masse,act}$ with the accepted-part reference compound pressure $p_{masse,ref}$; b) determining a target (Continued)

mold internal pressure curve $p_{wkz,soll}$ (t) for a holding-pressure phase of the current injection-molding cycle, wherein for this purpose a mold internal pressure curve $p_{wkz,ref}$ (t) of the accepted-part reference injection-molding cycle is adjusted at least in dependence on the compound pressure change $k_1$ detected in step a), and c) traveling the holding-pressure curve $p_{masse, Hld, act}$ (t) of the current injection-molding cycle in such a way that an actual mold internal pressure curve pwkz,act (t) of the current injection-molding cycle runs at least more closely along the target mold internal pressure curve $p_{wkz,soll}$ (t) than a mold internal pressure curve $p_{wkz,ref}$(t) that is unchanged in comparison with the accepted-part reference cycle.

18 Claims, 7 Drawing Sheets

(52) U.S. Cl.
CPC ............... *B29C 2945/76404* (2013.01); *B29C 2945/76498* (2013.01); *B29C 2945/76882* (2013.01); *B29C 2945/76949* (2013.01)

(58) Field of Classification Search
CPC .......... B29C 2945/76381; B29C 2945/76384; B29C 2945/76404; B29C 2945/76498; B29C 2945/76882; B29C 2945/76949; B29C 2945/76969; B29C 45/762; B29C 45/7646; B29C 45/766; B29C 45/77
See application file for complete search history.

(56) References Cited

U.S. PATENT DOCUMENTS

| | | |
|---|---|---|
| 2009/0278274 A1 | 11/2009 | Bader |
| 2015/0140148 A1* | 5/2015 | Komiya ................. B29C 45/762 425/149 |
| 2016/0250791 A1* | 9/2016 | Schiffers ............. B29C 45/7646 264/40.4 |
| 2017/0057147 A1* | 3/2017 | Altonen ............... G05B 19/042 |
| 2018/0272586 A1 | 9/2018 | Schiffers et al. |
| 2019/0337209 A1 | 11/2019 | Collins et al. |

FOREIGN PATENT DOCUMENTS

| | | |
|---|---|---|
| DE | 102005016618 B3 | 9/2006 |
| DE | 102005032367 A1 | 1/2007 |
| DE | 102007061775 A1 | 7/2009 |
| DE | 102013111257 B3 | 8/2014 |
| DE | 102015117237 B3 | 3/2017 |
| EP | 0897786 A2 | 2/1999 |
| EP | 2583811 A1 | 4/2013 |
| WO | 2019213380 A1 | 11/2019 |

OTHER PUBLICATIONS

International Search Report for PCT/EP2019/076368 dated Dec. 11, 2019.
Written Opinion for PCT/EP2019/076368 dated Dec. 11, 2019.
Hutchinson, H.R. "In-Process Control of Injection Viscosity" Modern Plastics, Oct. 1, 1970, vol. 47, No. 10, pp. 122-127.

* cited by examiner

METHOD FOR OPERATING AN INJECTION-MOULDING MACHINE, IN PARTICULAR WITH RESPECT TO IMPROVED CONSTANT MOULD FILLING, AND INJECTION-MOULDING MACHINE FOR CARRYING OUT THE METHOD

CROSS-REFERENCE TO RELATED APPLICATIONS

This is a National Stage application of PCT international application PCT/EP2019/076368 filed on Sep. 30, 2019, which claims the priority of German Patent Application No. 10 2018 126 313.9, filed Oct. 23, 2018, which are incorporated herein by reference in their entireties.

FIELD OF THE INVENTION

The invention relates to a method for operating an injection-moulding machine, in particular with respect to improved mould filling according to the preamble of claim 1 and an injection-moulding machine for carrying out the method.

BACKGROUND OF THE INVENTION

A conventional injection-moulding machine comprises in particular an injection mould into which a molten plastic compound is introduced. One or more cavities which form moulding cavities for the component are located in the injection mould. The mould additionally comprises a distributor system by means of which the molten plastic compound enters into the cavity (cavities). The injection-moulding machine usually comprises a heated cylinder by means of which the injection-moulding compound is melted and injected into the injection mould. A screw for advancing the injection-moulding compound is located in the cylinder. A conventional injection-moulding machine further comprises at least one fully regulated drive for the screw by means of which, inter alia, the pressure of the liquefied injection-moulding compound (compound pressure) inside the cylinder can be adjusted. For monitoring the injection-moulding process in conventional injection-moulding systems, pressure sensors are also provided in part in the mould, which sensors measure a local pressure of the liquid or solidifying injection-moulding compound inside the cavity (hereinafter designated as mould internal pressure).

An operating cycle of an injection-moulding machine is substantially divided into two phases, an injection phase in which the injection-moulding compound is injected into the cavity and a subsequent holding-pressure phase in which the cavity in the mould is already completely filled with injection-moulding compound in which, however a so-called holding pressure is maintained on the injection-moulding compound by the machine side to compact the compound and compensate for shrinkage.

For each injection mould there is an "ideal" form of the mould internal pressure curve over the injection-moulding cycle, i.e. over the injection phase and the holding-pressure phase which differs individually in detail. This ideal mould internal pressure curve is frequently determined as a reference curve in the course of a process optimization. The actual profile of the mould internal pressure in continuous production substantially depends on the flow behaviour of the plastic compound if the setting of the cylinder internal pressure (compound pressure) is the same. The flow behaviour is in turn determined, inter alia, by the chemical composition of the injection-moulding compound, the shear input and the temperature of the compound. In continuous production the cylinder internal pressure (compound pressure) and the adjustment of the switch-over position in the holding-pressure phase is usually set manually in such a manner that the mould internal pressure runs approximately on the reference curve. Larger deviations from this result in inferior parts which must be rejected.

Material-induced disturbance variables which influence the mould filling are, for example, fluctuations of the batch, the recyclate and the degree of drying. Furthermore, ambient and process-side disturbance effects can occur which, for example, can be fluctuations of the mould temperature control, the cylinder heating and the ambient temperature, the air humidity and also fluctuating closure behaviour of a back flow valve. All these effects bring about a viscosity change of the melt which in turn influences the filling of the cavity.

Re-starting processes initiate, for example, a reduction in viscosity since during the machine downtime energy is still introduced into the plastic compound due to the cylinder heating.

A viscosity change causes a change in the compound or mould internal pressure. FIG. 2 shows two cycles using polypropylene having different MFI (melt flow index) values with the same process settings for comparison, wherein a low-viscosity material (MFI 11) results in a lower compound pressure or a higher and more rapidly increasing mould internal pressure. This indicates a different filling behaviour of the cavity which, for example, in the case of a high-viscosity compound (MFI 6) results in an underfilling of the cavity when this material is processed with process parameters of a low-viscosity material (e.g. MFI 11).

Crucial for the different filling of the cavity is the different pressure application to the molten plastic compound at the switch-over point. Despite the constant switch-over position and the same injection speed, the compound is more strongly compressed at a high pressure, with the result that a higher density is obtained. Accordingly less melt volume is injected into the cavity. There are various solution approaches to compensate for a non-uniform filling of the cavity due to fluctuations of the flow behaviour in the material.

On the one hand, there is the concept of regulating the cavity filling by means of sensor systems which are installed on the machine side. In this case, the determined process parameters are adjusted using control variables so that a constant cavity filling is ensured independently of viscosity changes. The control variables are based on machine signals (e.g. compound pressure) and are usually referenced to one or more accepted-part cycles.

An alternative solution approach to the monitoring of cavity filling is the use of sensor systems installed on the mould side (mould internal pressure, mould wall temperature). Depending on the regulating concept, a process parameter is supplied to the injection-moulding machine which is adapted to the injection-moulding process so that a constant cavity filling is achieved.

The following is known from the prior art for machine-side possibilities for compensation for process fluctuations caused by perturbing influences:

1) DE 10 2015 117 237 B3:

This document relates to a method for determining a real volume Vr of an injection-mouldable compound during an injection-moulding process wherein the injection-mouldable compound is introduced into at least one cavity of a mould and comprises the steps:

a) determining a theoretical volume $V_t$ from process variables at least during a filling phase of the injection-moulding process,
b) determining and/or measuring at least one value for at least one compound pressure $p_M$
c) selecting a material-specific compression $k(p)$ of the injection-mouldable mass corresponding to the value of $p_M$,
d) calculating a real volume $V_r$ taking into account the compression $k(p)$. $V_r$ is kept constant here by adjusting the switch-over position and the holding-pressure level.

The melt volume introduced at the end of the holding pressure is kept constant. In order to achieve this, the level of the holding pressure is adjusted. A constant melt volume at the end of the holding pressure cannot, for example, compensate for the effects "fluctuation of the mould or melt temperature" or also "temperature-dependent shrinkage behaviour of the melt".

2) DE 10 2013 111 257 B3:

This document relates to a method for volumetrically correct filling of a mould cavity of a mould in which a moulded-part volume equivalent is determined in a learning phase and in a production phase production injection-moulding cycles are influenced in such a manner that the moulded-part volume equivalent determined in the learning phase is also satisfied in the production injection-moulding cycle. The adjustment is made by means of an influencing of the switch-over position and the holding-pressure level.

For the mould-side possibilities for compensating for process fluctuations caused by perturbing influences, the following is known from the prior art:

1) DE 10 2013 111 257 B3:

From this it is known that the holding-pressure level is calculated by means of a correction constant depending on the measured viscosity from the injection process. Since this process involves a control, the holding pressure can be specifically adjusted in the correct direction. However, for example, fluctuations of the melt temperature or changes in the mould temperature are not compensated although both effects have effects on the shrinkage or the cooling behaviour.

2) DE 2 358 911 A:

The speed of the flow front and the melt temperature are determined by compound pressure and temperature sensors in the injection mould so that the injection pressure and/or the injection speed are controlled depending on the measured values of the measured value sensor.

3) DE 35 24 310 C1:

A method for regulated injection moulding of plastic moulding compounds is described. Here the injection work (calculated from mould internal pressure) is used to control the injection moulding process. The end value for the screw path and the holding pressure profile (level and time) are stored and used for an adjustment factor. However, process control by means of the injection work has the disadvantage that it is very strongly characterized by irregularities in the warm-up phase of the injection process.

4) DE 10 2005 032 367 A1:

An approach is pursued in which the time required by the plastic melt in the cavity to (reach) a sensor is monitored. For this purpose temperature and pressure sensors are used in the mould. In the case of variations in the time, the viscosity of the melt is varied (e.g. by means of variation of the temperature).

5) EP 2 583 811 A1:

EP 2 583 811 A1 pursues the approach of a process regulation for the injection process to regulate the injection volume. Speed profile and switch-over point are varied during the injection phase in the event of a variation in the viscosity of the plastic melt and/or the introduced volume. The method is based on a comparison of the injection pressure curve of the mould internal pressure sensor with a reference curve.

The previously described solution approaches control or regulate in the same cycle. This is followed by solution approaches with an adaptive regulation in which regulating intervention is no longer made in the current cycle but in the following cycle.

6) DE 10 2007 061 775 A1:

The time behaviour of the mould internal pressure in the holding-pressure phase is measured. If this deviates from a comparative value, an adjusted holding pressure follows for a subsequent injection moulding run.

An injection moulding process is specified in which during the holding-pressure phase ($P_N$) of an injection moulding cycle ($Z^{(i)}$) the time behaviour of a mould internal pressure ($p_w$) is measured, in which at least one non-time-dependent characteristic ($p_a$; $p_{max}$; $t_{max}$; m, $t_1$, $t_2$) is determined from the recorded behaviour of the mould internal pressure ($p_w$), in which the or each characteristic ($p_a$; $p_{max}$; $t_{max}$; m, $t_1$, $t_2$) is compared with a stored characteristic target value ($p_{a,0}$) and in which an adjusted holding-pressure value ($p_N$) for a subsequent injection moulding cycle ($Z^{(i+1)}$) is determined automatically by means of the result of the comparison. A relevant injection moulding system comprises in particular an injection mould which is provided with an internal pressure sensor to record a mould internal pressure ($p_w$) as well as a holding pressure regulator configured to carry out the method.

Thus, a method is known from DE 10 2007 061 775 A1 which determines a maximum mould internal pressure in the holding-pressure phase and specifies this as reference value in the subsequent cycles. This mould internal pressure should be achieved again by an adjustment of the holding-pressure level. This method cannot compensate for any viscosity change and mould-side disturbance variables.

7) DE 10 2005 016 618 B3:

The relationship between pressure, temperature and viscosity in the injection phase is determined, wherein the pressure curve is measured and the temperature curve for this is determined mathematically. This is followed by a variation of the stagnation pressure and/or speed proportional to the measured pressure difference.

8) EP 897 786 A2:

A guide variable is derived by means of the measurement of the mould internal pressure (at a point at which the diameter transverse to the flow direction is maximal) and it is evaluated whether a readjustment is required. If a deviation occurs in several successive cycles, the most greatly deviating parameter is readjusted. The switch-over point is determined automatically from the internal pressure curve profile. In this case, the mould internal pressure curve is compared with a reference curve up to at least the seal point and a variation of the injection speeds is performed by quotients of integrals of current and reference curve.

BRIEF SUMMARY OF THE INVENTION

It is the object of the invention to provide a method for operating an injection moulding machine which is further optimized with respect to the mould filling and which reduces or even avoids the disadvantages of the prior art. In addition, it is the object of the invention to provide an injection moulding machine for carrying out the method.

In particular, a method for operating an injection moulding machine should be provided in which with regard to the moulded part volume/the cavity filling, the influence of material fluctuations and/or ambient conditions which have an influence on the material used can be compensated in an automated manner as far as possible and a proportion of rejects can be reduced. In particular, the method should compensate for viscosity variations of the injection-moulding compound and/or mould-side disturbance variables such as, for example, a partial failure or a deterioration of the cooling capacity.

Overall therefore the quality and reliability of the injection-moulding process should be improved and the yield of accepted parts should be increased.

It is furthermore an object of the invention to provide an injection-moulding machine for carrying out the method.

This object is achieved with the method according to the invention according to claim 1 and an injection-moulding machine according to claim 18. Advantageous embodiments are specified in the dependent claims.

In order to achieve the object(s), according to the invention a method for operating an injection-moulding machine is proposed, comprising the steps:

a) in a current injection-moulding cycle, after an accepted-part reference injection-moulding cycle learned in a learning phase: detecting a compound pressure change $k_1$ with respect to an accepted-part reference compound pressure $p_{masse,ref}$ during at least a part of an injection phase of the current injection-moulding cycle by measuring a current compound pressure $p_{masse,act}$ and comparing the current compound pressure $p_{masse,act}$ with the accepted-part reference compound pressure $p_{masse,ref}$, b) determining a target mould internal pressure curve $p_{wkz,soll}(t)$ for a holding-pressure phase of the current injection-moulding cycle, wherein for this purpose a mould internal pressure curve $p_{wkz,ref}(t)$ of the accepted-part reference injection-moulding cycle is adjusted at least depending on the compound pressure change $k_1$ detected in step a) and c) travelling the holding-pressure curve $p_{masse, Hld, act}(t)$ of the current injection-moulding cycle in such a manner that an actual mould internal pressure curve $p_{wkz, act}(t)$ of the current injection-moulding cycle runs at least more closely along the target mould internal pressure curve $p_{wkz,soll}(t)$ than a mould internal pressure curve $p_{wkz,ref}(t)$ that is unchanged with respect to the accepted-part reference cycle.

According to the invention therefore during an injection phase of the current injection-moulding cycle, a viscosity change of the material which may occur, which can, for example, be caused by temperature fluctuations, moisture fluctuations or fluctuations of other ambient conditions, is detected by measurement of a current compound pressure or compound pressure curve $p_{masse,act}(t)$ and in the knowledge of a corresponding compound pressure or compound pressure curve $p_{masse,ref}(t)$ With this finding from the injection phase of a current injection-moulding cycle, in the same injection-moulding cycle a target mould internal pressure curve $p_{wkz,soll}(t)$ is determined for a holding-pressure phase of this current injection-moulding cycle by means of an algorithm. In order to reach the target mould internal pressure curve $p_{wkz,soll}(t)$, a holding-pressure level $p_{masse,Hld,ref}(t)$ or a holding-pressure curve $p_{masse,Hld,ref}$ is adapted from a reference injection-moulding cycle depending on the compound pressure change $k_1$ detected in the injection phase. This compound pressure change $k_1$ is preferably determined, for example, from singular compound pressure values $p_{masse,act}/p_{masse,ref}$ in an injection phase, is particularly preferably determined from a compound pressure curve $p_{masse,act}(t)/p_{masse,ref}(t)$ during at least a part of the injection phase or from corresponding average values $p_{masse,avg,act}/p_{masse,ref,avg}$. A detection time interval for the compound pressure change $k_1$ or change in the compound pressure curve or an acquisition of values to determine an average value in the injection phase ends in this case at the switch-over point or so promptly before a switch-over point to be expected $t_1 = t_{umschalt}$ that an optionally displaced switch-over point can still be calculated and the switch-over can be initiated. The detection time interval for the compound pressure change or change in the compound pressure curve $k_1$ or an acquisition of values to determine an average value in the injection phase can either begin with the start of the injection of the plastic melt ($t_0 = t_{inj,start}$) or preferably, in particular in the case of using a back flow valve (RST) can start after a safely accomplished closure of the back flow valve.

From the comparison between the compound pressure curve $p_{masse,ref}(t)$ of an accepted-part reference injection moulding cycle and the compound pressure curve $p_{masse,act}(t)$ of the current injection-moulding cycle, in a departure from the established opinion of the technical experts, a new target mould internal pressure curve $p_{wkz,soll}(t)$ adapted to the changed conditions is now calculated, which takes into account the changed material and/or ambient conditions. In this case, from cycle to cycle or at least at intervals a target curve of the mould internal pressure is therefore determined anew quite intentionally since it was identified in the course of the invention that holding the mould internal pressure constant, as is frequently the aim of management of the injection-moulding process in the prior art, should be intentionally departed from.

Thus, according to the invention, in contrast to the prior art, depending on material and/or ambient conditions a new target mould internal pressure curve $p_{wkz,soll}(t)$ is calculated if necessary for each shot, which is then approached as far as possible by corresponding adaptation of the holding pressure which is a compound pressure $p_{masse,Hld}$ in the space before the plasticizing screw.

A preferred embodiment is characterized in that before, during or after step b), the method comprises the following steps:

b1) determining a target switch-over mould internal pressure $p_{wkz,umschalt,soll}$ for the current injection-moulding cycle at least depending on the compound pressure change $k_1$ detected in step a)

b) switching over upon reaching the target switch-over mould internal pressure $p_{wkz,umschalt,soll}$ determined in step b).

Thus, a target switch-over mould internal pressure $p_{wkz,umschalt,soll}$ for the current injection-moulding cycle can be calculated anew if necessary from shot to shot. Upon reaching this target switch-over mould internal pressure, a switch-over then takes place so that the effect according to the invention is achieved that the switch-over into the holding-pressure phase taking account of the viscosity is still influenced in the current injection-moulding cycle. After the switch-over, the holding-pressure phase begins in which the target mould internal pressure curve $p_{wkz,soll}(t)$ determined in step b) is then applied. This means that the holding-pressure phase is changed by adaptation of the holding pressure $p_{masse,Hld,act}$ such that the target mould internal pressure curve is achieved. If necessary, a deviation from the target mould internal pressure curve $p_{wkz,soll}(t)$ is compensated iteratively by a fine adjustment of the holding pressure phase in the following injection-moulding cycles. This is expediently accomplished by a monitoring (measurement) of the respectively current mould internal pressure curve $p_{wkz,act}(t)$ in the respectively current injection-moulding cycle.

Thus, the method according to the invention is therefore capable of detecting in one and the same cycle by measurement and application of easy-to-obtain parameters (e.g. pressures, temperatures, screw positions, volume flow, torque etc.) a property change, e.g. a viscosity change of the injection-moulding compound and already in that cycle in which the finding is obtained to perform adjustment steps in the holding-pressure phase. By this means and as a result of the cycle-specific adaptation of the target mould internal pressure curve $p_{wkz,soll}(t)$ according to the invention, it is possible to significantly reduce the proportion of rejects as a result of unsatisfactory mould filling according to the invention. The quality and reliability of the injection-moulding process is thus significantly reduced.

A preferred embodiment is characterized in that the determination of the target mould internal pressure curve $p_{wkz,soll}(t)$ is additionally determined depending on a pressure transmission characteristic $k_2$ between a mould internal pressure $p_{wkz}$ and a corresponding compound pressure $p_{masse}$ and/or using a material-specific factor $k_{mat}$.

The pressure transmission characteristic $k_2$ of a tool is understood as the ratio between a compound pressure $p_{masse}$ and a mould internal pressure $p_{wkz}$ of an injection-moulding cycle which results from this, wherein in addition to individual values of the said pressures, the curves or average values thereof can also be used. The pressure transmission characteristic $k_2$ produced from this forms a mould-specific influential factor which is preferably used in the following to determine the target mould internal pressure/target internal pressure curve. The inclusion of the pressure transmission characteristic $k_2$ of a tool provides for an increased accuracy and improved mould filling and/or component quality since, in addition to the viscosity change of the plastic melts which possibly occurs and which is to be take into account according to the invention, tool-specific characteristics such as, for example, component geometries, i.e. cavity geometries or geometries and designs of runners, for example as hot channels or the like, are also taken into account.

Furthermore, it is advantageous to take into account a material-specific factor $k_{mat}$ in the determination of the target mould internal pressure curve $p_{wkz,soll}(t)$. With this factor material properties to be determined empirically can be incorporated into the process management of the current injection-moulding process. This measure further enhances the accuracy and the component quality.

A further preferred embodiment is characterized in that in the accepted-part reference injection-moulding cycle and in the current injection-moulding cycle a compound pressure integral during injection is determined as measured variable which correlates with a processing viscosity of the melt, in particular according to the formula:

$$W_{z,act/ref} = \int_{t_0}^{t_1} p_{masse,act/ref}(t)dt,$$

wherein
$t_0$ is a time of beginning the injection phase $t_{inj,start}$ or a time after closure of a back flow valve and $t_1$ is a time of the switch-over $t_{inj,umschalt}$ or a time which lies after $t_0$ but before $t_{inj,umschalt}$.

According to this embodiment, in order to determine the mass pressure change $k_1$ in each case in the accepted-part reference injection-moulding cycle and in the current injection-moulding cycle, a quantity similar to an injection work is measured and calculated to determine a pressure integral in the time limits $t_0$ and $t_1$ in each case in the accepted-part reference injection-moulding cycle and in the current injection-moulding cycle. Such a pressure integral correlates with a processing viscosity of the melt so that in the further behaviour based on such pressure integrals, a changed process management can be determined effectively and accurately.

A further preferred embodiment is characterized in that in the accepted-part reference injection-moulding cycle and/or in the current injection-moulding cycle additionally at least one of the following quantities is determined and recorded if necessary:

maximum mould internal pressure $p_{wkz,max}$ as well as the appurtenant time $t_{wkz,max}$, a drop of the mould internal pressure after reaching the maximum $(m_1)$ a mould internal pressure average $p_{wkz,avg}$ and/or a compound pressure average $p_{masse,avg}$ in the injection phase and/or a mould internal pressure average $p_{wkz,Hld,avg}$ and/or a compound pressure average $p_{masse,Hld,avg}$ in the holding-pressure phase, a mould internal pressure area $p_{a,wkz}$ in the holding-pressure phase, in particular as pressure integral according to the following formula $$\int_{t_2}^{t_3} p_{wkz,Hld}(t)$$

a compound pressure area $p_{a,masse}$ in the holding-pressure phase, in particular as pressure integral according to the following formula $$\int_{t_2}^{t_3} p_{masse,Hld}(t)$$

wherein:
$p_{wkz,Hld}$ (t) is the mould internal pressure curve in the holding-pressure phase, $p_{masse,Hld}$ (t) is the compound pressure curve in the holding-pressure phase, $p_{wkz,avg}$ is an average of the mould internal pressure during the injection phase, $p_{masse,avg}$ is an average of the compound pressure during the injection phase, $p_{wkz,Hld,avg}$ is an average of the mould internal pressure during the holding-pressure phase, $p_{masse,Hld,avg}$ is an average of the compound pressure in the holding-pressure phase, $t_2$ is a time at or after the switch-over point, in particular is the switch-over point and $t_3$ is a time after $t_2$, e.g. the time of the end of the holding-pressure phase $t_{Hld,End}$ or a time before the end of the holding-pressure phase, in particular the time $t_{wkz,max}$ of the maximum mould internal pressure of the respective cycle.

In parallel to the process variables or process parameters already mentioned above, it is advantageously possible to determine further process variables/process parameters. Thus, for example, the knowledge of a maximum mould internal pressure $p_{wkz,max}$ and the appurtenant time $t_{wkz,max}$ and a knowledge of the drop of the mould internal pressure $m_1$ after reaching this maximum is a good indication of a temperature change of the melt in the holding-pressure phase after this time. This furthermore results in good possibilities for adjustment of the holding-pressure curve after passing through the maximum mould internal pressure $p_{wkz,max}$.

In order to simplify calculations in the injection phase and/or in the holding-pressure phase, it can be expedient to determine averages instead of pressure integrals, for compound pressure average $p_{masse,avg}$ in the injection phase and the holding-pressure phase.

The determination of the mould internal pressure area $p_{a,wkz}$ and the compound pressure area $p_{a,masse}$ in each case in the holding-pressure phase can be determined in a particularly accurate manner, as an integral in the time limits $t_2$ and $t_3$ which makes it possible to make a highly accurate determination of the target mould internal pressure $p_{wkz,soll}(t)$ for a following cycle or the holding pressure resulting herefrom. Here $t_2$ is a time after the switch-over point, i.e. a time of the holding-pressure phase $t_3$ expediently lies after $t_2$ and can be selected in a particularly preferable manner as the time of the maximum mould pressure $t_{wkz,max}$. This in particular has the advantage that calculations can then be made already and optionally in the time interval after reaching the maximum mould pressure further changes can be made at the end of the holding-pressure phase still in the same injection-moulding cycle.

A further preferred embodiment is characterized in that a ratio of the pressure integral during injection in the current injection-moulding cycle and the pressure integral during injection of the accepted-part reference injection-moulding cycle is determined as the compound pressure change $k_1$, in particular according to the formula $$k_1 = W_{z,act}/W_{z,ref} \text{ or}$$

a ratio of the average of the compound pressure during injection in the current injection-moulding cycle and the average of the compound pressure during injection of the accepted-part reference injection-moulding cycle is determined as the compound pressure change $k_1$, in particular according to the formula $$k_1 = p_{masse,Hld,avg}/p_{masse,ref,avg} \text{ or}$$

a ratio of one or more pressure individual values during injection in the current injection-moulding cycle and during injection of the accepted-part reference injection-moulding cycle is determined as the compound pressure change $k_1$, in particular according to the formula $$k_1 = p_{masse,act}/p_{masse,ref}$$

From the measurement and/or process variables determined beforehand, both in the accepted-part reference injection-moulding cycle and also in the current injection-moulding cycle, the compound pressure change $k_1$, which reflects a change in the melt properties, in particular of the melt viscosity of the current injection-moulding cycle with respect to an accepted-part reference injection-moulding cycle, can then be simply calculated preferably in the aforesaid procedures. In this case, the calculation of the compound pressure change $k_1$ as the ratio of the compound pressure integrals $W_z$ is the most accurate approach. In principle, the determinations of the compound pressure change $k_1$ via given ratios of the averages or even individual compound pressure points however function with somewhat reduced accuracy/reproducibility.

A further preferred embodiment is characterized in that a dependence between mould internal pressure $p_{wkz}$ and compound pressure $p_{masse}$ during the holding-pressure phase in the accepted-part reference injection-moulding cycle and in the current injection-moulding cycle is determined as a pressure transmission characteristic $k_2$, in particular according to at least one of the formulae a) $k_2 = \dfrac{\int_{t2}^{t3} p_{wkz,Hld}(t)}{\int_{t2}^{t3} p_{masse,Hld}(t)}$, b) $k_2 = \dfrac{p_{wkz,Hld,avg}}{p_{masse,Hld,avg}}$ c) $k_2 = \dfrac{p_{wkz,Hld}}{p_{masse,Hld}}$ wherein:
- $p_{masse,Hld}(t)$ is the compound pressure curve during the holding-pressure phase
- $p_{wkz,Hld}(t)$ is the mould internal pressure curve during the holding-pressure phase,
- $t_2$ is a time at or after the switch-over point, in particular is the switch-over time $t_{inj/umschalt}$ and
- $t_3$ is the time of the end of the holding-pressure phase $t_{Hld,End}$ or a time before the end of the holding-pressure phase but after $t_2$.

The pressure transmission characteristic $k_2$, which is substantially a mould-specific influential parameter, can also be formed in the aforesaid manner by means of a ratio of pressure integrals, a ratio of averages or a ratio of individual pressure values, wherein these determinations are in the said order of decreasing accuracy. In return, the calculation and in particular also the observation time of the corresponding pressures required for the calculation is simplified. When determining the pressure transmission characteristic $k_2$, pressures, averages or pressure integrals are related, wherein the corresponding values of the mould pressure in the holding-pressure phase are located in the numerator and the corresponding values of the compound pressure in the holding-pressure phase are located in the denominator.

A further preferred embodiment is characterized in that the temporal mould internal pressure curve $p_{wkz,ref}(t)$ of the accepted-part reference injection-moulding cycle and/or of the current injection-moulding cycle n wkz, act (within the injection and/or the holding-pressure phase is recorded by means of at least one mould internal pressure sensor.

A further preferred embodiment is characterized in that the target mould internal pressure curve $p_{wkz,soll}(t)$ of the current injection-moulding cycle is determined according to the formula $$p_{wkz,soll}(t) = p_{wkz,ref}(t) \cdot \dfrac{k_{mat}}{k_1 \cdot k_2}$$

wherein
$k_{mat}$ are one or more empirically determined material-specific factors and
$k_1, k_2$ are factors which take into account at least the flow behaviour of the melt and/or a mould-specific dependence between compound pressure $p_{masse}$ and resulting mould internal pressure $p_{wkz}$.

Using the previously determined values, a target mould internal pressure curve $p_{wkz,soll}(t)$ can be calculated in a simple manner according to the formula specified above, wherein in particular the appurtenant mould internal pressure curve $p_{wkz,ref}(t)$ of the accepted-part injection-moulding cycles is modified as starting point by using the factors $k_{mat}$ and $k_1$ and $k_2$.

A further preferred embodiment is characterized in that the pressure transmission characteristic $k_2$ is calculated from a pressure transmission function $f(p_{masse,Hld,ref,i})$ recorded in the accepted-part reference injection-moulding cycle, wherein $$f(p_{masse,Hld,ref,i}) = \int_{t_2}^{t_3} p_{wkz,ref,i}(t).$$

In order to eliminate scatters of the mould pressure curve $p_{wkz,trg}(t)$ in the accepted-part reference injection-moulding cycle, it is recommended to record several such profiles and determine the pressure transmission characteristic $k_2$ by means of a family of mould internal pressure curves and thus be able to provide a pressure transmission function. Such a pressure transmission function $f(p)$ obtained over several accepted-part reference injection-moulding cycles offers an improved/more stable prediction of the pressure transmission characteristic in the accepted-part reference injection-moulding cycle which is of great importance for the further process controls.

A further preferred embodiment is characterized in that in an injection mould which has a plurality of mould internal pressure sensors, the method is carried out in parallel for one or more of these mould internal pressure sensors.

If a plurality of mould internal pressure sensors are provided in an injection mould, it is possible to carry out the method in parallel for one or several of this mould internal pressure sensors, i.e. that the corresponding target mould internal pressure curve is determined for each mould internal pressure sensor and then these target curves are approximated as well as possible by management of the corresponding holding pressure in the current injection-moulding cycle.

A further preferred embodiment is characterized in that during the holding-pressure phase of the current injection-moulding cycle, the actual mould internal pressure $w_{wkz,act}$ obtained from the calculated holding-pressure change is measured and compared with the target mould internal pressure $p_{wkz,soll}$.

In order to verify the process management, it is expedient to measure the actual mould internal pressure $w_{wkz,act}$ of the current injection-moulding cycle and compare this with the target mould internal pressure for this cycle.

A further preferred embodiment is characterized in that the method is applied for holding-pressure phases with several profile stages.

The method is also particularly suitable for using holding-pressure phases with several profile stages. In particular, the method according to the invention can advantageously be used both for each profile stage individually and also for an average over profile stages.

A further preferred embodiment is characterized in that in order to determine a current switch-over point in the current injection-moulding cycle, the switch-over mould internal pressure $p_{wkz,umschalt,ref}$ of the accepted-part reference injection-moulding cycle is determined/read out at the switch-over point of the accepted part reference injection-moulding cycle, then a target switch-over mould internal pressure $p_{wkz,umschalt,soll}$ corresponding to the switch-over mould internal pressure $p_{wkz,umschalt,ref}$ of the accepted-part reference injection-moulding cycle is determined on the target mould internal pressure curve $p_{wkz,soll}(t)$ of the current injection-moulding cycle and as soon as $p_{wkz,act} \geq p_{wkz,umschalt,soll}$ in the current injection-moulding cycle, a switch-over takes place from the injection phase into the holding-pressure phase.

With the method according to the invention, a switch-over mould internal pressure changed with respect to the accepted-part reference injection-moulding cycle can be determined in a particularly simple manner, which in particular takes into account mould-specific and/or melt-specific changes. After reaching a new target switch-over mould internal pressure, a switch-over takes place in the current injection-moulding cycle so that a correspondingly accurate process adaptation also takes place in this respect.

In this embodiment of the invention, starting from the target switch-over mould internal pressure, calculation back to the appurtenant switch-over mould pressure in the current injection-moulding cycle is additionally made and switch-over takes place at this determined switch-over compound pressure. This enables a switch-over only on the basis of a compound pressure measurement.

A further preferred embodiment is characterized in that in order to reach the target mould internal pressure curve $p_{wkz,soll}(t)$ in the current injection-moulding cycle, the target holding-pressure curve $p_{masse,Hld,soll}(t)$ required for this in the current injection-moulding cycle is calculated according to one of the following formulae a) $p_{masse,Hld,soll}(t) = \dfrac{p_{wkz,soll}(t)}{\int_{t_2}^{t_3} p_{wkz,ref}(t)} \cdot \int_{t_2}^{t_3} p_{masse,Hld,ref}(t) = p_{wkz,soll}(t) \cdot k_2^{-1}$ or b) $p_{masse,Hld,soll}(t) = $ $\dfrac{p_{wkz,soll}(t)}{p_{wkz,ref,avg}} \cdot p_{masse,Hld,ref,avg} = p_{wkz,soll}(t) \cdot k_2^{-1}$ or c) $p_{masse,Hld,soll}(t) = \dfrac{p_{wkz,soll}(t)}{p_{wkz,ref}} \cdot p_{masse,Hld,ref} = p_{wkz,soll}(t) \cdot k_2^{-1}$ wherein $p_{masse,Hld,ref}$ is a holding-pressure parameter, $p_{masse,Hld,ref}(t)$ is the holding-pressure curve, $p_{masse,Hld,ref,avg}$ is an average of the holding pressure and $p_{wkz,ref,avg}$ is an average of the mould internal pressure of the accepted-part reference injection-moulding cycle.

The given formulae relate to the compound pressure curves in the holding-pressure phase necessary/sufficient to achieve the target mould internal pressure curve. Both the corresponding pressure integrals (formula a)), average values (formula b)) or individual values (formula c)) are suitable for this, wherein the accuracy decreases from a) to c) but the computing expenditure also decreases.

A further preferred embodiment is characterized in that during the holding-pressure phase of the current injection-moulding cycle, the actual mould internal pressure curve $p_{wkz,act}(t)$ of the current injection-moulding cycle is compared with the target mould internal pressure curve $p_{wkz,soll}(t)$ and the holding-pressure curve $p_{masse,Hld,ref}(t)$ is adjusted iteratively during the current injection-moulding cycle or in a subsequent injection-moulding cycle such that any deviation is compensated over several cycles.

In the event that a deviation of the actual mould internal pressure curve from the target mould internal pressure curve is established, it is expedient to approximate this iteratively. In particular, the deviation between actual mould internal pressure curve and target mould internal pressure curve should be reduced iteratively from cycle to cycle.

A further preferred embodiment is characterized in that the target holding-pressure curve $p_{masse,Hld,soll}(t)$ of the current injection-moulding cycle is calculated according to the formula $$p_{masse,Hld,soll}(t) = \frac{p_{wkz,soll}(t)}{\int_{t2}^{t3} p_{wkz,ref}(t)} \cdot \int_{t2}^{t3} p_{masse,Hld,ref}(t) + (p_{wkz,soll}(t) - p_{wkz,act}(t)) \cdot k_3$$

wherein $k_3$ is a control factor.

For the iterative approximation it is particularly expedient to form a difference between a target mould internal pressure curve and an actual mould internal pressure curve and to incorporate this in the determination of the holding pressure by means of a control factor $K_3$.

Furthermore, the object is achieved according to the invention by an injection-moulding machine which is adapted and configured to carry out the method according to one or more of the claims.

In the inventive method, the filling process of one or more cavities is measured by means of at least one or preferably several mould internal sensors. During filling an algorithm stores preferably at least one of the following parameters: a time curve of the mould internal pressure signal, a time at which the mould internal pressure increases due to the plastic melt flowing past, a maximum value of the pressure and a pressure area under the curve. It is thereby deduced at what percentage of the filling volume or where on the flow path the sensor or sensors are placed.

The parameters obtained from the algorithm are stored time-discretely in distance-dependent pressure points as reference during one or more learning cycles in the injection-moulding machine.

If a viscosity change of the plastic melt now occurs, e.g. due to a batch change, this is measured during the injection phase. The pressure change derived from the viscosity change in the injection phase is determined in the inventive method from which this calculates a new viscosity-dependent target mould internal pressure curve for the holding pressure phase. By means of the target mould internal pressure curve during the injection phase a new switch-over mould internal pressure is calculated for the now active cycle and thus the switch-over takes place in a viscosity-dependent manner.

Depending on the viscosity a higher or lower pressure drop from the machine-side injection nozzle to the end of the flow path of the cavity is produced over the flow path of the plastic melt in the cavity.

That is, in the method according to the invention, on the basis of a change of the pressure requirement (viscosity) in the injection phase, a new target mould internal pressure curve for one or more mould internal pressure sensors is calculated for the holding-pressure phase. Thus, the holding-pressure level and preferably the switch-over time in the current cycle is adjusted by means of the described ratio. Furthermore material-specific factors are used for the calculation of the holding-pressure level which take account of the shrinkage and cooling behaviour of the different plastics. In the holding pressure phase the mould internal pressure resulting from the holding-pressure change is compared with the previously calculated target mould internal pressure. If deviations are established, over several iterations the holding-pressure level, e.g. over the regulating cycle, or an amplification factor $k_3$ between the viscosity and pressure change in the injection phase is adjusted for the next cycle. This method is preferably also applied for injection and holding-pressure phases with several profile stages.

The viscosity-dependent re-calculation of the target mould internal pressure curve of the method according to the invention is furthermore used for the shift of the switch-over point by specifying the re-calculated pressure at the switch-over position of the screw from the reference cycle as switch-over condition. This results in a temporal, compression-dependent shift of the mould internal pressure. In addition, RSP fluctuations can also be taken into account by means of a compound pressure increase.

If more than one mould internal pressure sensor is installed in the mould, the pressure drop can be determined by means of the flow path length. In this case, regulation is preferably accomplished on the sensor which is placed as far as possible at the end of the flow path.

BRIEF DESCRIPTION OF THE DRAWINGS

In the following, the invention is explained in detail as an example with reference to the figures. In the figures.

DESCRIPTION OF EXAMPLE EMBODIMENTS

Fundamental relationships between pressure, viscosity and filling volume of a cavity in the injection moulding process will now be explained hereinafter with reference to FIGS. 1 and 2.

Figure 1:
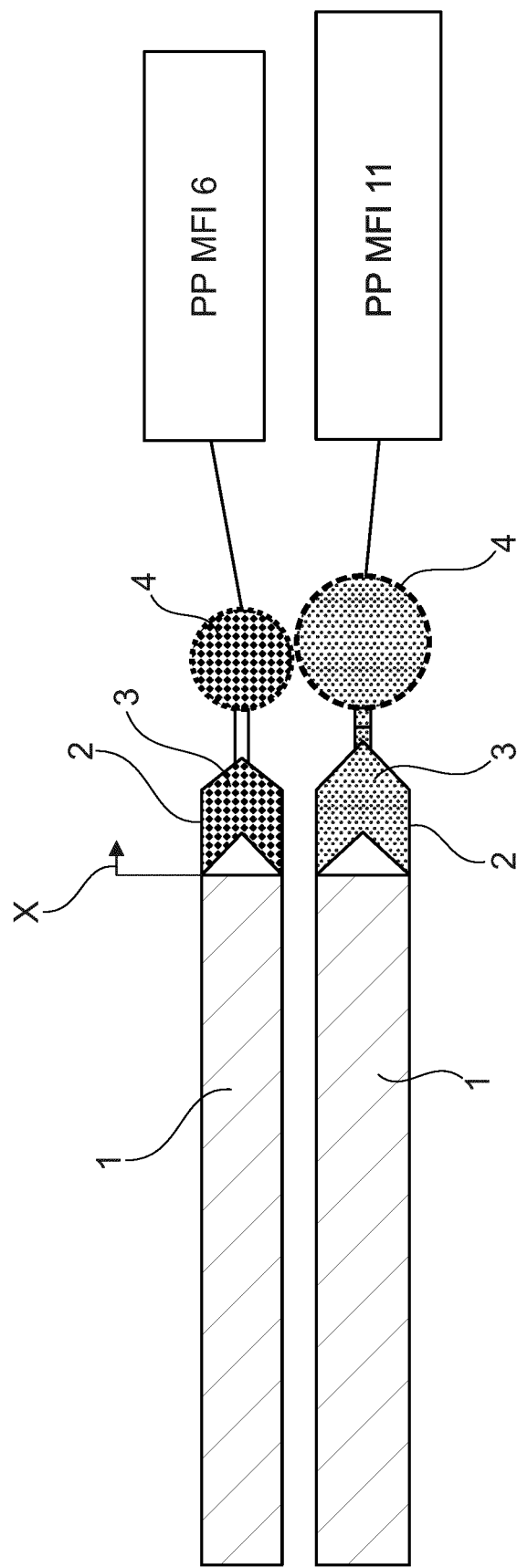
FIG. 1: shows an exemplary diagram of a compressed injection-mouldable compound at the switch-over point for a lower-viscosity ("thinner liquid") plastic melt (MFI 11) and a higher-viscosity ("more viscous liquid") plastic melt (MFI 6)
Figure 2:
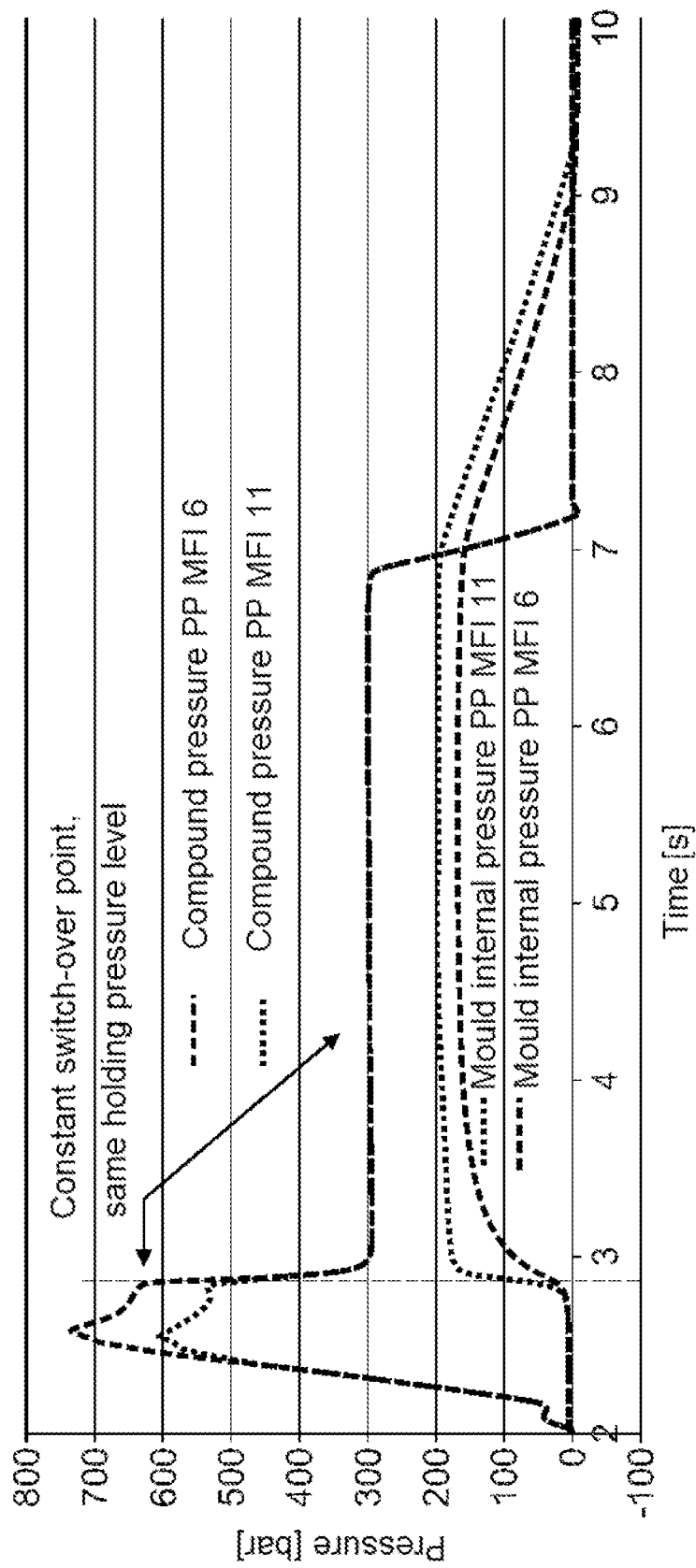
FIG. 2: shows schematically a compound pressure and mould internal pressure curve of two cycles with the same process adjustments but injection-mouldable compounds (materials) having different viscosities (MFI values)

FIG. 1 shows highly schematically a screw 1 in a screw cylinder 2 of a plastic injection moulding machine (not shown). In the upper diagram in FIG. 1 a polypropylene material (PP material) having a melt flow index (melt flow index MFI) of 6 is located in a screw pre-chamber 3 and shown schematically in a cavity 4. This constitutes a relatively highly viscous (thick liquid) material in the melt state.

In the example of FIG. 1 shown below, a polypropylene which however has a lower viscosity (thinner liquid) in the melt and has a melt flow index MFI of 11 is likewise located in the screw pre-chamber 3 and in the cavity 4. It is clear that in the same screw positions X the cavity 4 in the example case of polypropylene with MFI=11 contains more melt volume (filling volume). In the case of the higher-viscosity material (polypropylene MFI 6) an increased pressure requirement is required to bring the higher-viscosity melt into the cavity 4. In this respect at a higher pressure level the melt of the PP MFI 6 material is more strongly compressed with the result that a smaller filling volume arrives in the cavity 4 than in the case of a lower-viscosity PP MFI 11 material. When applied to a real injection-moulding process this has the result that the cavity of a mould with otherwise the same parameters is less completely filled in an injection-moulding process with higher-viscosity material than with a lower-viscosity material.

Likewise, a change in the compound pressure curve or the mould internal pressure curve results from the viscosity difference between two materials with otherwise constant injection speed and geometry etc. Compound pressure curve or compound pressure are understood according to the invention as pressures or pressure curves which are formed in a screw pre-chamber 3 during a process. Such compound pressures or such compound pressure curves are temporally assigned hereinafter to an injection phase of an injection moulding process. The terms "mould internal pressure" and "mould internal pressure curve" relate to pressures or pressure curves measured in a cavity or generally in an interior of a mould. Temporally the terms "mould internal pressure" and "mould internal pressure curve" within the framework of this description predominantly relate to the holding-pressure phase of an injection-moulding process. The term "holding pressure/holding-pressure curve is fundamentally understood, unless specified otherwise, as the compound pressure during a holding-pressure phase, i.e. that pressure of the melt that is located in the screw pre-chamber 3.

By reference to FIG. 2 it is clear that a compound pressure curve of the lower-viscosity melt material PP MFI runs below the compound pressure or the compound pressure curve of a higher-viscosity melt material of PP MFI 6 material during the entire injection phase of the depicted injection-moulding process. Conversely in the holding pressure phase, a mould internal pressure curve of the thinner-liquid (lower viscosity) material PP MFI 11 is arranged above the mould internal pressure or the mould internal pressure curve of a melt of a higher-viscosity material MFI 6 during the entire holding-pressure phase. In particular, it is striking that at a switch-over point which is shown by a vertical dashed line in FIG. 2, the mould internal pressure with the lower-viscosity material PP MFI 11 increases significantly more substantially than with the higher-viscosity material PP MFI 6. These significant differences in the pressure curves result in different mould fillings and as a result, extremely different component qualities. The aim is to optimize the moulded part filling and ensure a process-reliable complete filling of the moulds and thus a constant accepted-part volume independently of the viscosity.

In the following, it is mentioned, for example, that the determined pressure curves, i.e. the compound pressure (compound pressure curve) and the mould internal pressure (mould internal pressure curve) of the lower-viscosity polypropylene (PP MFI 11) is used as reference curve R for the further explanation, from which inventive adjustments are accomplished for example. Thus, assuming that the curves of the lower-viscosity polypropylene (PP MFI 11) are learnt as reference curves in a reference cycle, the viscosity increases due to a batch change to a higher-viscosity polypropylene similarly to the curve of PP MFI 6.

Figure 3:
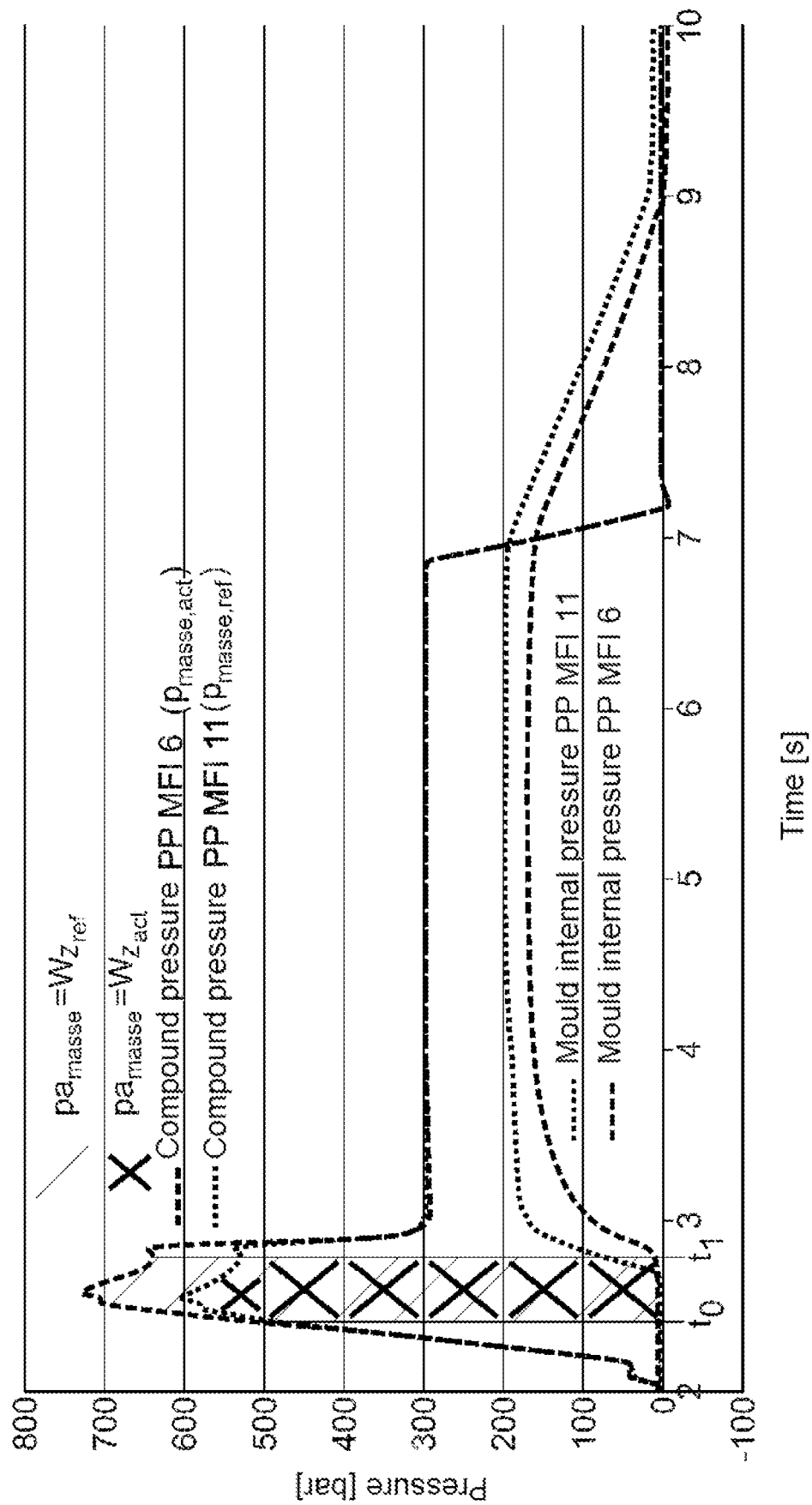
FIG. 3: shows compound pressure and mould internal pressure curves for two melts having different viscosity (polypropylene MFI 6) and polypropylene MFI 11) with particular illustration of a measurement range in which the compound pressure is measured in the injection phase and thus the flowability (viscosity) of the plastic compound can be evaluated or is evaluated.

FIG. 3 shows by means of the dashed line for a PP MFI 6 (higher-viscosity polypropylene) the curve of the compound pressure $p_{masse}$ during the injection and holding-pressure phase. In addition, the diagram according to FIG. 3 shows by means of the dark-dotted line the compound pressure curve n masse of a PP MFI 11 (lower-viscosity polypropylene melt) during the injection and the holding-pressure phase.

A narrow hatched area between time limits $t_0$ and $t_1$ represents a compound pressure area $p_{a,masse}$ below the compound pressure curve of the PP MFI 6. This compound pressure area corresponds to the injection work $W_{z,ref}$ in the limits between $t_0$ and $t_1$, wherein the lower time limit to lies after closure of a back flow valve and the upper time limit $t_1$ still lies before a switch-over point.

Within the same limits $t_0$ and $t_1$ a cross-hatched area in FIG. 3 shows a compound pressure area $p_{a,masse}$ of the PP MFI 11, i.e. of the thinner-liquid polypropylene melt. This area corresponds to the injection work $W_{z,act}$ and within the limits $t_0$ to $t_1$ is smaller than the injection work $W_{z,ref}$ of the thicker-liquid (higher-viscosity) PP MFI 6 melt.

In the further course, the compound pressure curve of the two PP melts MFI 6 and MFI 11 during the holding-pressure phase shows the same pressure behaviour (prior art). In the lower diagram range this results in differently running mould internal pressures. The light-dotted line represents the mould internal pressure curve $p_{wkz}(t)$ of the lower-viscosity PP melt (MFI 11). This curve lies at a higher level compared with a mould internal pressure curve of a PP MFI 6 melt which is thicker-liquid and shown by a dark-dashed line.

In order to determine a compound pressure change k1 during the injection phase on transition from a first melt to a second melt having different viscosity, expediently a quotient of the injection work $W_{z,act}$ of a current injection-moulding cycle and the injection work $W_{z,ref}$ of an accepted-part reference injection-moulding cycle is now formed. In the present example, for example, the compound pressure curve of the PP MFI 11 melt should be regarded as the reference compound pressure curve $p_{masse,ref}$ and the compound pressure curve $p_{masse,act}$ of the PP MFI 6 melt should be regarded as the compound pressure curve $p_{masse,act}$ of the current injection moulding cycle.

According to the invention, now at least taking into account the compound pressure change $k_1$, preferably additionally taking into account a pressure transmission characteristic $k_2$ and a material-dependent factor $k_{mat}$, a conversion is made from the mould internal pressure of the accepted-part reference injection-moulding cycle (here: mould internal pressure of the PP MFI 11 melt) to a target mould internal pressure curve $p_{wkz,soll}(t)$ for the thick-liquid PP MFI 6 melt to be processed in the current injection-moulding cycle.

In order to determine the pressure transmission characteristic of the mould used, the factor $k_2$ is determined from a ratio of the pressure integrals over the mould internal pressure curve during at least a part of the holding-pressure phase $p_{wkz,Hld}(t)$ and over the compound pressure $p_{masse,Hld}(t)$ within the limits $t_2$ to $t_3$. Here $t_2$ is a time at or after the switch-over point. $t_3$ is a time after $t_2$ and before the end of the holding-pressure phase. Preferably here a time $t_{wkz,max}$ of the maximum mould internal pressure $p_{wkz,masse}$ is used for $t_3$.

Alternatively the factor $k_2$ can also be formed as the quotient of average values of the mould internal pressure $p_{wkz,Hld,avg}$ and the mould pressure $p_{masse,Hld,avg}$ during the holding-pressure phase.

Further alternatively individual pressure values of these curves can also be used. A material-specific factor $k_{mat}$ is determined empirically and introduces material-specific property changes of a melt of the current injection-moulding cycle with respect to the melt of the accepted-part reference injection-moulding cycle.

From this the following calculation can then be made according to the formula $$p_{wkz,soll}(t) = p_{wkz,ref}(t) \cdot \frac{k_{mat}}{k_1 \cdot k_2}$$

Such a target mould pressure curve tends to lie above a mould internal pressure curve when the holding pressure remains unchanged during a transition from a lower-viscosity melt as reference melt to a thicker-liquid (higher-viscosity) melt of a current injection-moulding cycle.

Figure 4:
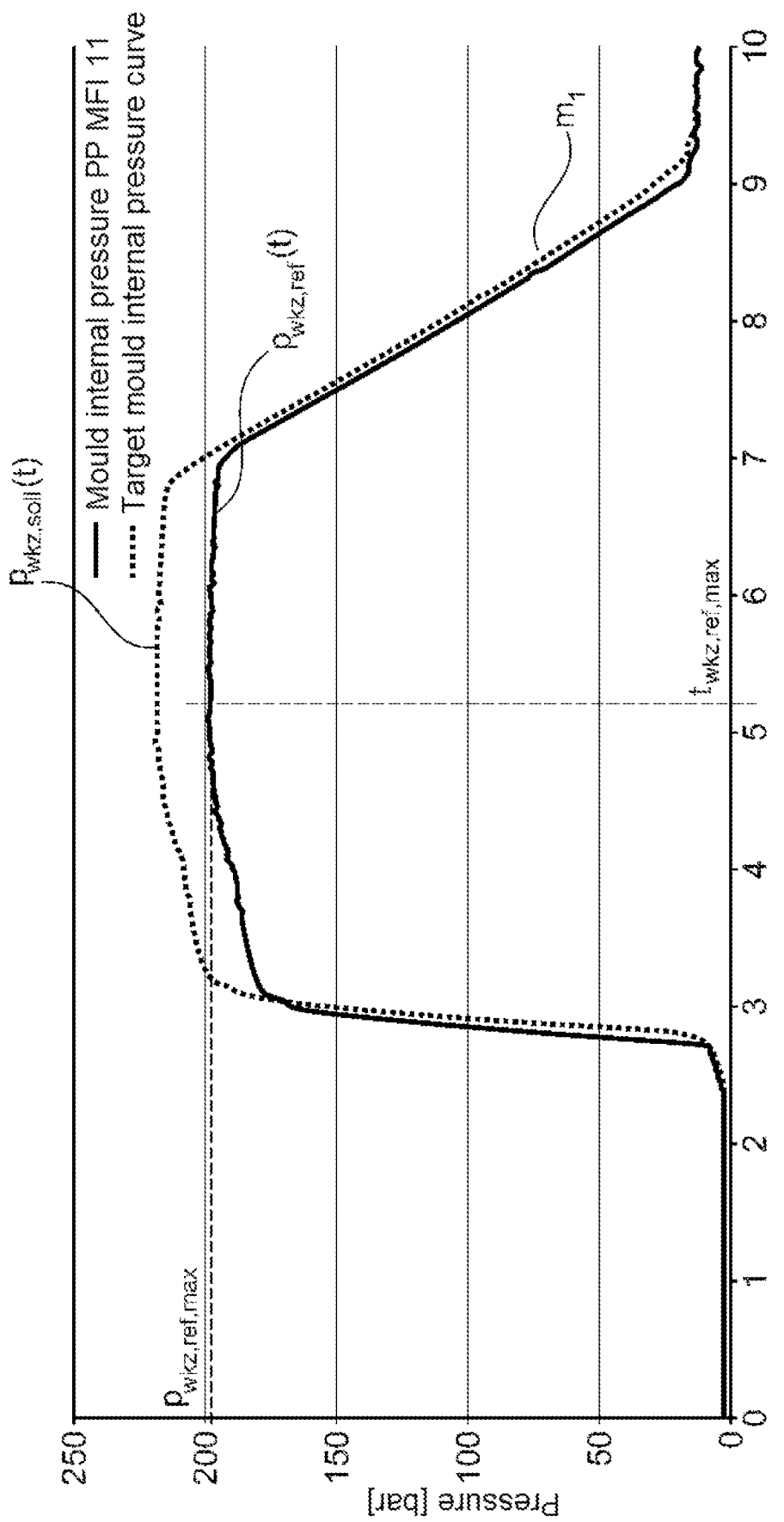
FIG. 4: shows a reference mould internal pressure from an accepted-part reference injection-moulding cycle and a calculated target mould internal pressure curve which is obtained for a higher-viscosity material.

After obtaining the target mould internal pressure curve $p_{wkz,soll}(t)$, a holding-pressure curve $p_{masse,Hld,act}(t)$ corresponding to the target mould internal pressure curve $p_{wkz,soll}(t)$ can now be calculated by means of the pressure transmission characteristic $k_2$. For this purpose the corresponding target holding pressure can be calculated with low computing expenditure by dividing the target mould internal pressure curve by the factor $k_2$. This applies both to the use of pressure integrals over a sub-region of the mould internal pressure and the compound pressure and also to the average values thereof or even individual values. This then results in a holding-pressure curve $p_{masse,Hld,act}(t)$ to be travelled in the holding pressure phase of the current injection-moulding cycle which in the example described lies above the holding pressure which fluctuates when the mould internal pressure is unchanged (cf. FIG. 4 for the determination of the target mould internal pressure curve $p_{wkz,soll}(t)$).

Figure 5:
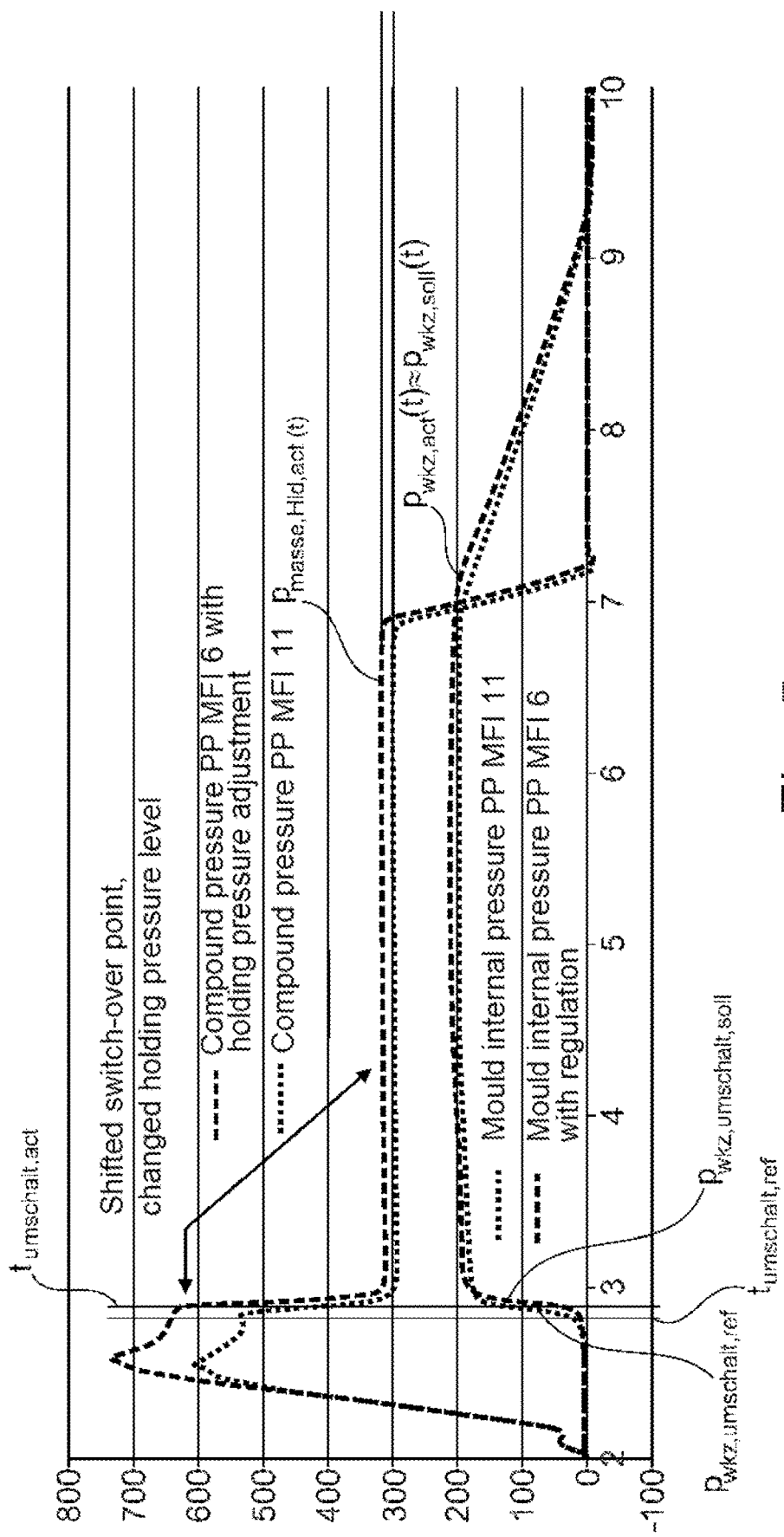
FIG. 5: shows two exemplary compound pressure curves for PP MFI 6 and PP MFI 11 during the injection phase and their mould internal pressure curves in the holding pressure phase with particular illustration of a changed switch-over point and a changed holding-pressure level.

The previously described process can also be seen in FIG. 5. In addition, it can be identified from FIG. 5 that a switch-over point of the accepted-part reference injection-moulding cycle ($t_{umschalt,ref}$) during a transition from the accepted-part reference injection-moulding cycle (PP MFI 11 melt) to the current injection-moulding cycle (PP MFI 6 melt) is shifted backwards in time to a time $t_{umschalt,act}$. In order to determine the switch-over time of the current injection-moulding cycle $t_{umschalt,act}$, in the accepted-part reference injection-moulding cycle the mould internal pressure $p_{wkz,umschalt,ref}$ at the switch-over point is selected as starting point. This value for the mould internal pressure in the accepted-part reference injection-moulding cycle at the switch-over point is converted in the manner according to the invention to a target mould internal pressure $p_{wkz,umschalt,soll}$ and upon reaching this mould internal pressure $p_{wkz,umschalt,soll}$ in the current injection-moulding cycle switch-over takes place in the current injection-moulding cycle. This then yields the switch-over time $t_{umschalt,act}$. The holding-pressure curve $p_{masse,Hld,act}(t)$ after the switch-over is then travelled in such a manner that the resulting actual mould internal pressure curve $p_{wkz,act}(t)$ of the current injection-moulding cycle follows as closely as possible, ideally precisely the target mould internal pressure curve $p_{wkz,soll}(t)$.

In the event that such a precise following of the target mould internal pressure curve $p_{wkz,soll}(t)$ is not entirely achieved, this is optionally iteratively approximated in following cycles.

Figure 6:
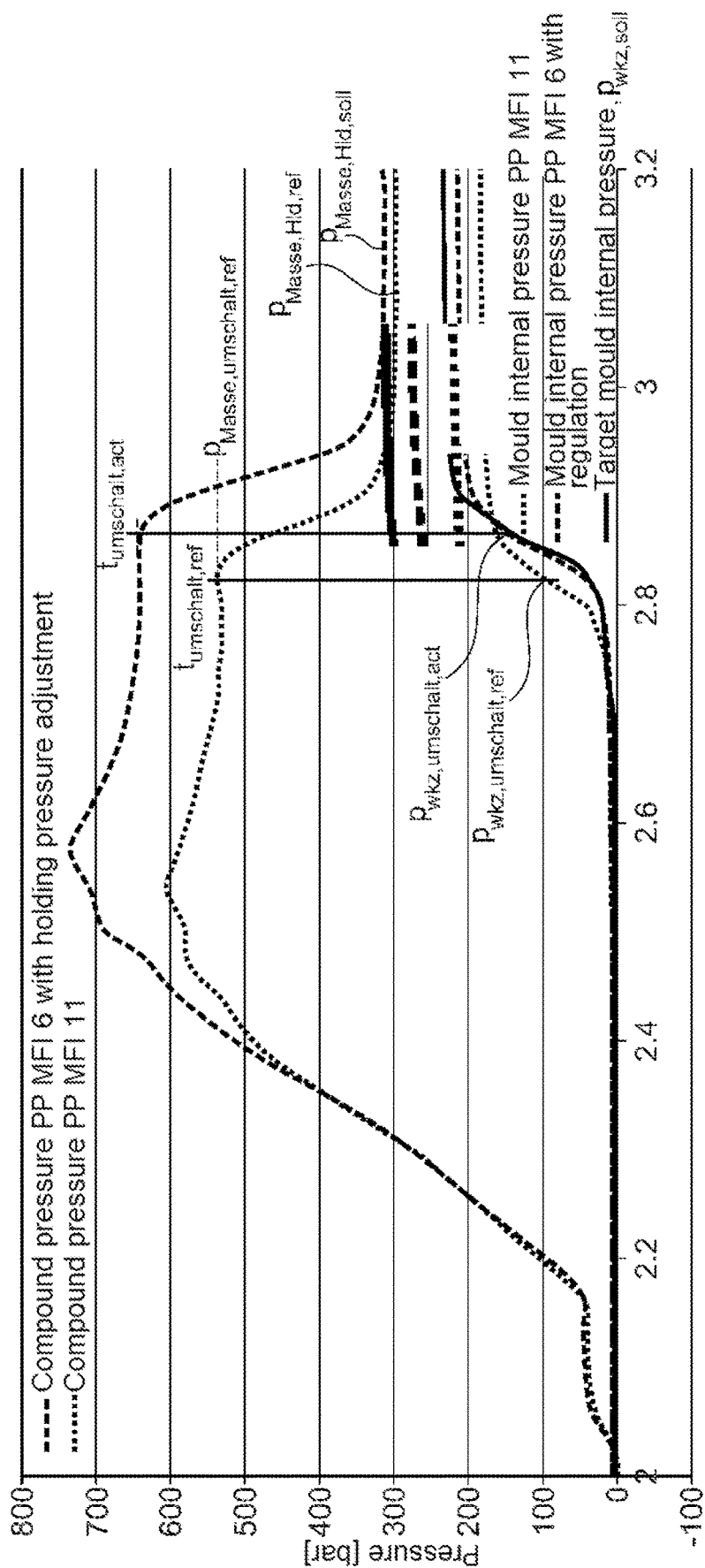
FIG. 6: shows a compound pressure and mould internal pressure curve of a low-viscosity or higher-viscosity plastic melt (PP MFI 11 and PP MFI 6) with measurement and control variable required for the inventive method.

This procedure and also the previously described procedure for determining the switch-over point in the current injection-moulding cycle starting from the switch-over point of the accepted-part reference injection-moulding cycle can also be seen from FIG. 6. The indicated pressure curves over time in FIG. 6 are drawn somewhat further spaced apart with regard to their scaling in order to illustrate that according to the invention the aim is specifically not pursued to keep the mould internal pressure as identical as possible by suitable holding-pressure adjustment although different melts with different material properties are used but specifically a melt-specific adjustment also takes place taking into account pressure transmission characteristics of the mould with regard to the mould internal pressure and in order to achieve this target mould internal pressure determined independently of melt and/or pressure transmission, a holding-pressure adjustment aimed at this takes place in the method according to the invention.

The method according to the invention is designed for use on electro- and hydromechanical injection-moulding machines of all sizes. Thus, it is possible to use the method in all new machines and as a retrofit. A prerequisite is at least one mould internal pressure sensor integrated in the machine.

Injection-moulding machines operated using the method are able to automatically compensate for negative effects of, for example, batch fluctuations on the moulded part quality. Likewise negative effects on the moulded part quality upon restarting the machines (after faults or down time) are automatically compensated by calculating the optimal target mould internal pressure curve or characteristics derived therefrom. The machine operator needs to intervene in the production process less frequently in order, for example, to manually track adjustment parameters. The quality differences of the individual moulded parts are reduced to a minimum even under changing production conditions. Cost savings due to automation and process reliability are the direct consequence.

As a result of a targeted evaluation of the parameters at the machine, faults in the mould or the mould temperature control can also be identified. Furthermore, it is possible to change the mould between two injection-moulding machines without a tedious start-up and adjustment process being required to set a robust process point. The moulded-part quality can be reproduced independently of machine, personnel or raw material without expensive follow-up checks being required.

Figure 7:
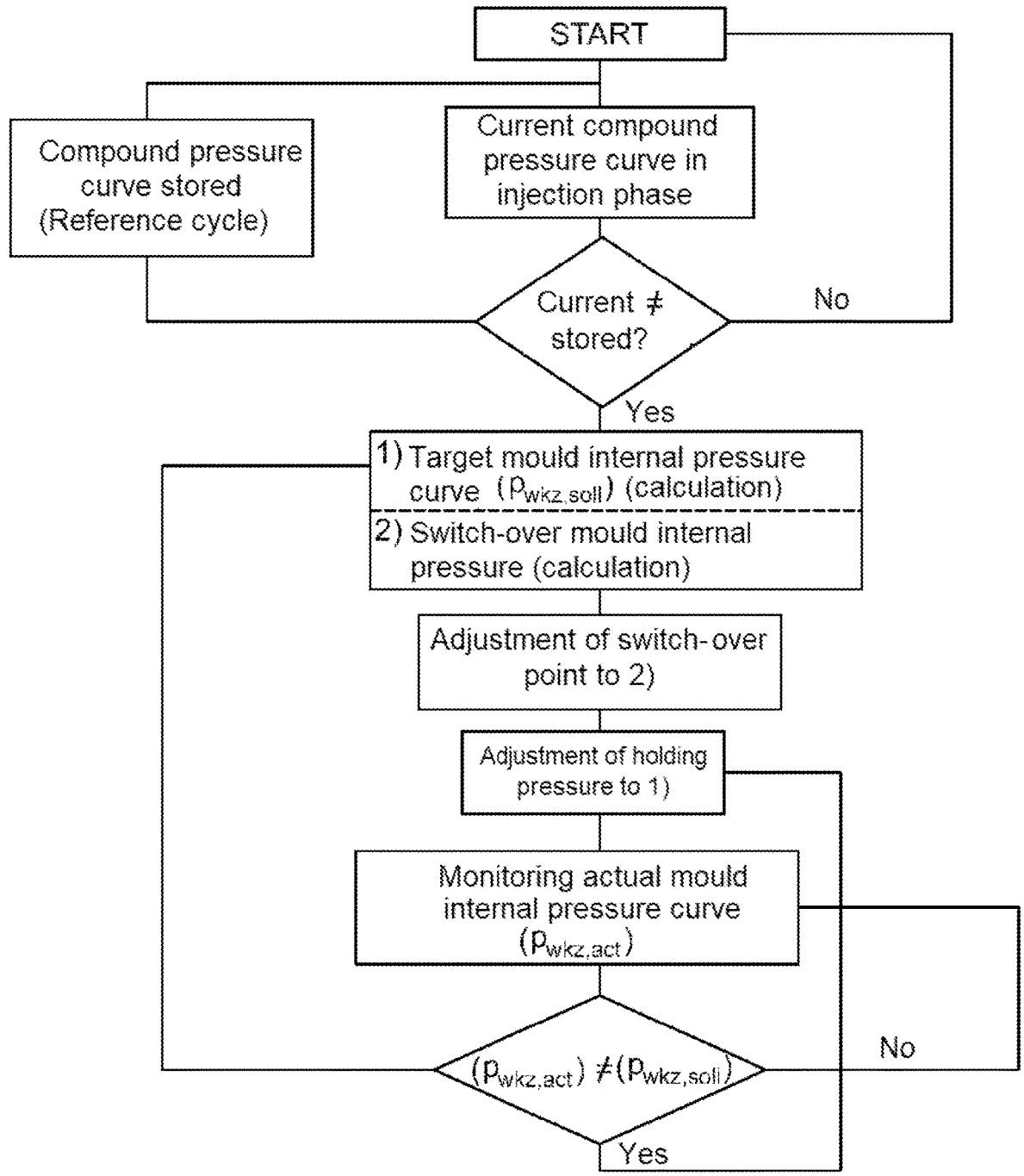
FIG. 7: shows a flow diagram of the method according to the invention.

The invention is explained in detail hereinafter as an example by reference to a flow diagram according to FIG. 7.

There exists a stored compound pressure curve $p_{masse,ref}(t)$ which originates from an accepted-part reference injection-moulding cycle. Furthermore, a current compound pressure curve $p_{masse,act}(t)$ is recorded, for example, measured during the injection phase of an actual injection-moulding cycle.

The reference compound pressure curve $p_{masse,ref}(t)$ and the current compound pressure curve $p_{masse,act}(t)$ are compared. If the actual compound pressure curve $p_{masse,act}(t)$ is the same as the reference compound pressure curve $p_{masse,ref}(t)$ or the difference is below a certain threshold value, the injection-moulding cycle is not modified with regard to its further course. If the difference between the reference compound pressure curve $p_{masse,ref}(t)$ and the actual compound pressure curve $p_{masse,act}(t)$ exceeds a certain limit, a target mould internal pressure curve $p_{wkz,soll}(t)$ is initially calculated depending on the quotient. This target mould internal pressure curve $p_{wkz,soll}(t)$ should be achieved as accurately as possible in the holding-pressure phase of the current injection-moulding cycle. Furthermore, preferably as a second measure a switch-over mould internal pressure $p_{wkz,umschalt}$ is calculated, which also depends on the magnitude of the quotient of the reference compound pressure curve $p_{masse,ref}(t)$ and the actual compound pressure curve $p_{masse,act}(t)$ in the injection phase. After these calculations, the holding pressure $p_{masse,Hld}$ is adjusted in such a manner that the target mould internal pressure curve $p_{wkz,soll}(t)$ is travelled as accurately as possible. The switch-over point is also adapted so that switch-over takes place at the calculated switch-over mould internal pressure $p_{wkz,umschalt}$. The actual mould internal pressure curve $p_{masse,act}(t)$ during the holding-pressure phase is monitored (measured). If the actual mould internal pressure curve $p_{masse,act}(t)$ is the same as the target mould internal pressure curve $p_{wkz,soll}(t)$ or falls below a certain limit, no further adjustment of the holding pressure $p_{masse,Hld}$ is accomplished in the next cycle, that is the next cycle is travelled with the same mould internal pressure curve as the current cycle. If the difference exceeds a certain limit, the holding pressure in the next cycle is iteratively adjusted so that the target mould internal pressure curve $p_{wkz,soll}(t)$ is reached at the latest as far as possible after a few cycles.

REFERENCE LIST

1 Screw
2 Cylinder
3 Screw pre-chamber
4 Cavity
$t_0, t_1$ Time points/integration limits
EP Injection phase
MFI 11 Low-viscosity plastic melt
MFI 6 High-viscosity plastic melt
PP MFI 11 Low-viscosity polypropylene
$p_{wkz,ref}(t)$ Mould internal pressure curve in accepted-part reference injection-moulding cycle
$p_{wkz,ref,max}$ Maximum mould internal pressure in reference cycle
$t_{wkz,ref,max}$ Time of $p_{wkz,ref,max}$
$p_a$ Mould internal pressure area
$k_1$ Correction factor
$W_z$ Injection work
$p_{wkz}$ Mould internal pressure
$t_{xfr,ref}$ Switch-over point (reference cycle)
$p_{masse,umschalt,ref}$ Switch-over pressure (reference cycle)
$p_{wkz,act}(t)$ Actual mould internal pressure curve
$p_{masse,Hld,ref}$ Holding pressure level (reference cycle)
$p_{wkz,soll}(t)$ Target mould internal pressure curve
$p_{masse,act}$ Compound pressure curve of the current injection-moulding cycle
$p_{masse,ref}(t)$ Reference compound pressure curve//compound pressure curve of the accepted-part reference injection-moulding cycle
$p_{masse,Hld,act}(t)$ Holding pressure curve of the current injection-moulding cycle
$p_{wkz,act}$ Actual mould internal pressure curve of the current injection-moulding cycle
$p_{wkz,umschalt,act}$ Switch-over mould internal pressure of the current injection-moulding cycle
$p_{masse}$ Compound pressure
$t_{inj,start}$ Time of the beginning of injection
$t_{inj,umschalt}$ Time of the switchover
$p_{masse,Hld}$ Compound pressure during the holding-pressure phase
$p_{wkz,Hld}$ Mould internal pressure during the holding-pressure phase
$t_{umschalt}$ Time of the switch-over
$t_{Hld,end}$ Time of the end of the holding-pressure phase
$p_{wkz,max}$ Maximum mould internal pressure
$t_{wkz,max}$ Time of the maximum mould internal pressure
$p_{a,wkz}$ Mould internal pressure area
$p_{a,masse}$ Compound pressure area
$k_{mat}$ Material-specific factor
$k_i$ ($k_1$, $k_2$) Process-specific factors
$p_{wkz,ref,umschalt}$ Mould internal pressure of the earlier injection-moulding cycle or of the accepted-part reference injection-moulding cycle at the switch-over point

What is claimed is:

1. Method for operating an injection-moulding machine comprising the steps:
   a) in a current injection-moulding cycle, after an accepted-part reference injection-moulding cycle learned in a learning phase: detecting a compound pressure change $k_1$ with respect to an accepted-part reference compound pressure $p_{masse,ref}$ during at least a part of an injection phase of the current injection-moulding cycle by measuring a current compound pressure $p_{masse,act}$ and comparing the current compound pressure $p_{masse,act}$ with the accepted-part reference compound pressure $p_{masse,ref}$;
   b) determining a target mould internal pressure curve $p_{wkz,soll}(t)$ for a holding-pressure phase of the current injection-moulding cycle, wherein for this purpose a mould internal pressure curve $p_{wkz,ref}(t)$ of the accepted-part reference injection-moulding cycle is adjusted at least depending on the compound pressure change $k_1$ detected in step a) and
   c) travelling the holding-pressure curve $p_{masse,Hld,act}(t)$ of the current injection-moulding cycle in such a manner that an actual mould internal pressure curve $p_{wkz,act}(t)$ of the current injection-moulding cycle runs at least more closely along the target mould internal pressure curve $p_{wkz,soll}(t)$ than a mould internal pressure curve $p_{wkz,ref}(t)$ that is unchanged with respect to the accepted-part reference cycle.

2. Method according to claim 1, wherein before, during or after step b), the method comprises the following steps:
   b1) determining a target switch-over mould internal pressure $p_{wkz,umschalt,soll}$ for the current injection-moulding cycle at least depending on the compound pressure change k1 detected in step a)
   b2) switching over upon reaching the target switch-over mould internal pressure $p_{wkz,umschalt,soll}$ determined in step b).

3. Method according to claim 1, wherein the determination of the target mould internal pressure curve $p_{wkz,soll}(t)$ is additionally determined depending on a pressure transmission characteristic between a mould internal pressure $p_{wkz}$ and a corresponding compound pressure $p_{masse}$ and/or using a material-specific factor $k_{mat}$.

4. Method according to claim 1, wherein in the accepted-part reference injection-moulding cycle and in the current injection-moulding cycle a compound pressure integral during injection is determined as measured variable which correlates with a processing viscosity of the melt, according to the formula:

$$W_{z,act/ref} = \int_{t_0}^{t_1} p_{masse,act/ref}(t)\,dt,$$

wherein
- $t_0$ is a time of beginning the injection phase $t_{inj,start}$ or a time after closure of a back flow valve and
- $t_1$ is a time of the switch-over $t_{inj,umschalt}$ or a time which lies after $t_0$ but before $t_{inj,umschalt}$.

5. Method according to claim 1, wherein in the accepted-part reference injection-moulding cycle and/or in the current injection-moulding cycle additionally at least one of the following quantities is determined and recorded if necessary:
- maximum mould internal pressure $p_{wkz,max}$ as well as the appurtenant time $t_{wkz,max}$,
- a drop of the mould internal pressure after reaching the maximum ($m_1$)
- a mould internal pressure average $p_{wkz,avg}$ and/or a compound pressure average $p_{masse,avg}$ in the injection phase and/or a mould internal pressure average $p_{wkz,Hld,avg}$ and/or a compound pressure average $p_{masse,Hld,avg}$ in the holding-pressure phase,
- a mould internal pressure area $p_{a,wkz}$ in the holding-pressure phase, as pressure integral according to the following formula $$\int_{t2}^{t3} p_{wkz,Hld}(t)$$

a compound pressure area $p_{a,masse}$ in the holding-pressure phase, as pressure integral according to the following formula $$\int_{t2}^{t3} p_{masse,Hld}(t)$$

wherein:
- $p_{wkz,Hld}(t)$ is the mould internal pressure curve in the holding-pressure phase,
- $p_{masse,Hld}(t)$ is the compound pressure curve in the holding-pressure phase,
- $p_{wkz,avg}$ is an average of the mould internal pressure during the injection phase,
- $p_{masse,avg}$ is an average of the compound pressure during the injection phase,
- $p_{wkz,Hld,avg}$ is an average of the mould internal pressure during the holding-pressure phase,
- $p_{masse,Hld,avg}$ is an average of the compound pressure in the holding-pressure phase,
- $t_2$ is a time at or after the switch-over point, being the switch-over point and
- $t_3$ is a time after $t_2$, e.g. the time of the end of the holding-pressure phase $t_{Hld,End}$ or a time before the end of the holding-pressure phase, being the time $t_{wkz,max}$ of the maximum mould internal pressure of the respective cycle.

6. Method according to claim 1, wherein a ratio of the pressure integral during injection in the current injection-moulding cycle and the pressure integral during injection of the accepted-part reference injection-moulding cycle is determined as the compound pressure change $k_1$, according to the formula $$k_1 = W_{z,act}/W_{z,ref}$$

or
a ratio of the average of the compound pressure during injection in the current injection-moulding cycle and the average of the compound pressure during injection of the accepted-part reference injection-moulding cycle is determined as the compound pressure change k1, according to the formula $$k_1 = p_{masse,Hld,avg}/p_{masse,ref,avg}$$

or
a ratio of one or more pressure individual values during injection in the current injection-moulding cycle and during injection of the accepted-part reference injection-moulding cycle is determined as the compound pressure change k1, according to the formula $$k_1 = p_{masse,act}/p_{masse,ref}.$$

7. Method according to claim 1, wherein a dependence ($k_2$) between mould internal pressure $p_{wkz}$ and compound pressure $p_{masse}$ during the holding-pressure phase in the accepted-part reference injection-moulding cycle and in the current injection-moulding cycle is determined as a pressure transmission characteristic, according to at least one of the formulae a) $k_2 = \dfrac{\int_{t2}^{t3} p_{wkz,Hld}(t)}{\int_{t2}^{t3} p_{masse,Hld}(t)}$, b) $k_2 = \dfrac{p_{wkz,Hld,avg}}{p_{masse,Hld,avg}}$ c) $k_2 = \dfrac{p_{wkz,Hld}}{p_{masse,Hld}}$ wherein:
- $p_{masse,Hld}(t)$ is the compound pressure curve during the holding-pressure phase
- $p_{wkz,Hld}(t)$ is the mould internal pressure curve during the holding-pressure phase,
- $t_2$ is a time at or after the switch-over point, being the switch-over time $t_{inj/umschalt}$ and
- $t_3$ is the time of the end of the holding-pressure phase $t_{Hld,End}$ or a time before the end of the holding-pressure phase but after $t_2$.

8. Method according to claim 1, wherein the temporal mould internal pressure curve $p_{wkz,ref}(t)$ of the accepted-part reference injection-moulding cycle and/or of the current injection-moulding cycle $p_{wkz,act}(t)$ within the injection and/or the holding-pressure phase is recorded by means of at least one mould internal pressure sensor.

9. Method according to claim 1, wherein the target mould internal pressure curve $p_{wkz,soll}(t)$ of the current injection-moulding cycle is determined according to the formula $$p_{wkz,soll}(t) = p_{wkz,ref}(t) \cdot \dfrac{k_{mat}}{k_1 \cdot k_2}$$

wherein
- $k_{mat}$ are one or more empirically determined material-specific factors and
- $k_1$, $k_2$ are factors which take into account at least the flow behaviour of the melt and/or a mould-specific dependence between compound pressure $p_{masse}$ and resulting mould internal pressure $p_{wkz}$.

10. Method according to claim 1, wherein the dependence $k_2$ is calculated from a pressure transmission function ($p_{masse,Hld,ref,i}$) recorded in the accepted-part reference injection-moulding cycle, wherein $$f(p_{masse,Hld,ref,i}) = \int_{t2}^{t3} p_{wkz,ref,i}(t).$$

11. Method according to claim 1, wherein in an injection mould which has a plurality of mould internal pressure sensors, the method is carried out in parallel for one or more of these mould internal pressure sensors.

12. Method according to claim 1, wherein during the holding-pressure phase of the current injection-moulding cycle, the actual mould internal pressure $w_{wkz,act}$ obtained from the calculated holding-pressure change is measured and compared with the target mould internal pressure $p_{wkz,soll}$.

13. Method according to claim 1, wherein the method is applied for holding-pressure phases with several profile stages.

14. Method according to claim 1, wherein order to determine a current switch-over point in the current injection-moulding cycle, the switch-over mould internal pressure $p_{wkz,umschalt,ref}$ of the accepted-part reference injection-moulding cycle is determined/read out at the switch-over point of the accepted part reference injection-moulding cycle, then a target switch-over mould internal pressure $p_{wkz,umschalt,soll}$ corresponding to the switch-over mould internal pressure $p_{wkz,umschalt,ref}$ of the accepted-part reference injection-moulding cycle is determined on the target mould internal pressure curve $p_{wkz,soll}(t)$ of the current injection-moulding cycle and as soon as $p_{wkz,act} \geq p_{wkz,umschalt,soll}$ in the current injection-moulding cycle, a switch-over takes place from the injection phase into the holding-pressure phase.

15. Method according to claim 1, wherein in order to reach the target mould internal pressure curve $p_{wkz,soll}(t)$ in the current injection-moulding cycle, the target holding-pressure curve $p_{masse,Hld,soll}(t)$ required for this in the current injection-moulding cycle is calculated according to one of the following formulae a) $p_{masse,Hld,soll}(t) = \dfrac{p_{wkz,soll}(t)}{\int_{t2}^{t3} p_{wkz,ref}(t)} \cdot \int_{t2}^{t3} p_{masse,Hld,ref}(t) = p_{wkz,soll}(t) \cdot k_2^{-1}$ or b) $p_{masse,Hld,soll}(t) = \dfrac{p_{wkz,soll}(t)}{p_{wkz,ref,avg}} \cdot p_{masse,Hld,ref,avg} = p_{wkz,soll}(t) \cdot k_2^{-1}$ or c) $p_{masse,Hld,soll}(t) = \dfrac{p_{wkz,soll}(t)}{p_{wkz,ref}} \cdot p_{masse,Hld,ref} = p_{wkz,soll}(t) \cdot k_2^{-1}$ wherein $p_{masse,Hld,ref}$ is a holding-pressure parameter, $p_{masse,Hld,ref}(t)$ is the holding-pressure curve, $p_{masse,Hld,ref,avg}$ is an average of the holding pressure and $p_{wkz,ref,avg}$ is an average of the mould internal pressure of the accepted-part reference injection-moulding cycle.

16. Method according to claim 1, wherein during the holding-pressure phase of the current injection-moulding cycle, the actual mould internal pressure curve $p_{wkz,act}(t)$ of the current injection-moulding cycle is compared with the target mould internal pressure curve $p_{wkz,soll}(t)$ and the holding-pressure curve $p_{masse,Hld,act}(t)$ is adjusted iteratively during the current injection-moulding cycle or in a subsequent injection-moulding cycle such that any deviation is compensated over several cycles.

17. Method according to claim 1, wherein the target holding-pressure curve $p_{masse,Hld,soll}(t)$ of the current injection-moulding cycle is calculated according to the formula $p_{masse,Hld,soll}(t) =$ $\dfrac{p_{wkz,soll}(t)}{\int_{t2}^{t3} p_{wkz,ref}(t)} \cdot \int_{t2}^{t3} p_{masse,Hld,ref}(t) + (p_{wkz,soll}(t) - p_{wkz,act}(t)) \cdot k_3$ wherein $k_3$ is a control factor.

18. Injection-moulding machine which is adapted and configured to carry out the method according to claim 1.

* * * * *